US012118236B2

(12) United States Patent
Retter et al.

(10) Patent No.: US 12,118,236 B2
(45) Date of Patent: Oct. 15, 2024

(54) DYNAMICALLY ALLOCATING MEMORY CONTROLLER RESOURCES FOR EXTENDED PREFETCHING

(71) Applicant: International Business Machines Corporation, Armonk, NY (US)

(72) Inventors: Eric E. Retter, Austin, TX (US); Lilith Hale, Austin, TX (US); Brad William Michael, Cedar Park, TX (US); John Dodson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 561 days.

(21) Appl. No.: 17/446,318

(22) Filed: Aug. 30, 2021

(65) Prior Publication Data
US 2023/0060194 A1   Mar. 2, 2023

(51) Int. Cl.
*G06F 3/06* (2006.01)
(52) U.S. Cl.
CPC .......... *G06F 3/0656* (2013.01); *G06F 3/0604* (2013.01); *G06F 3/0631* (2013.01); *G06F 3/0659* (2013.01); *G06F 3/0679* (2013.01)

(58) Field of Classification Search
CPC .... G06F 3/0656; G06F 3/0604; G06F 3/0631; G06F 3/0659; G06F 3/0679; G06F 13/1605
See application file for complete search history.

(56) References Cited

U.S. PATENT DOCUMENTS

| | | | |
|---|---|---|---|
| 4,807,110 A * | 2/1989 | Pomerene | G06F 12/0862 711/213 |
| 7,146,467 B2 | 12/2006 | Bearden et al. | |
| 7,412,566 B2 * | 8/2008 | Lee | G06F 12/0862 709/250 |
| 7,464,246 B2 | 12/2008 | Gill et al. | |
| 7,562,185 B2 * | 7/2009 | Matsuda | G06F 3/0677 710/33 |
| 8,160,085 B2 * | 4/2012 | Voruganti | H04L 49/90 370/428 |
| 9,111,576 B2 * | 8/2015 | Kim | G11B 20/10527 |
| 9,465,744 B2 | 10/2016 | Dale et al. | |
| 10,296,460 B2 | 5/2019 | Sudhir et al. | |

(Continued)

OTHER PUBLICATIONS

A. Ros and A. Jimborean, "The Entangling Instruction Prefetcher," in IEEE Computer Architecture Letters, vol. 19, No. 2, pp. 84-87, Jul. 1-Dec. 2020, doi: 10.1109/LCA.2020.3002947, https://ieeexplore.ieee.org/document/9119076.

*Primary Examiner* — Ramon A. Mercado
(74) *Attorney, Agent, or Firm* — Stosch Sabo

(57) ABSTRACT

A memory controller comprises a system bus interface that connects the MC to a system processor, a system memory interface that connects the MC to a system memory, a read buffer comprising a plurality of entries constituting storage areas, the entries comprising at least one read buffer entry (RBE) and at least one extended prefetch read buffer entry (EPRBE), read buffer logic, dynamic controls that are used by the read buffer logic, and an MC processor comprising at least one extended prefetch machine (EPM), each corresponding to one of the at least EPRBEs, where the MC processor is configured to allocate and deallocate EPRBEs and RBEs according to an allocation method using the dynamic controls.

19 Claims, 4 Drawing Sheets

(56) References Cited

U.S. PATENT DOCUMENTS

| | | | |
|---|---|---|---|
| 10,955,901 B2 | 3/2021 | Ashkar et al. | |
| 10,990,289 B2* | 4/2021 | Barrell | G06F 12/0862 |
| 11,853,219 B2* | 12/2023 | Kim | G06F 12/0862 |
| 2003/0208660 A1* | 11/2003 | van de Waerdt | G06F 12/0862 |
| | | | 711/170 |
| 2004/0205298 A1 | 10/2004 | Bearden | |
| 2004/0260909 A1* | 12/2004 | Lee | G06F 12/0862 |
| | | | 711/170 |
| 2006/0059311 A1* | 3/2006 | Van De Waerdt | G06F 12/0862 |
| | | | 711/213 |
| 2006/0069871 A1 | 3/2006 | Gill | |
| 2006/0174068 A1* | 8/2006 | Drerup | G06F 13/28 |
| | | | 711/137 |
| 2008/0005480 A1* | 1/2008 | Lubbers | G06F 12/0862 |
| | | | 711/137 |
| 2012/0131241 A1* | 5/2012 | Robertson | G06F 12/127 |
| | | | 710/56 |
| 2012/0144060 A1* | 6/2012 | Russo | H04L 67/06 |
| | | | 709/234 |
| 2014/0136643 A1* | 5/2014 | Aerrabotu | G06F 15/167 |
| | | | 709/213 |
| 2015/0082000 A1* | 3/2015 | Hong | G06F 12/1027 |
| | | | 711/205 |
| 2016/0034400 A1 | 2/2016 | Dale | |
| 2016/0154750 A1* | 6/2016 | Park | G06F 3/061 |
| | | | 711/153 |
| 2017/0034064 A1* | 2/2017 | Everhart | G06F 9/5011 |
| 2017/0250923 A1* | 8/2017 | Eker | H04L 67/10 |
| 2018/0004670 A1 | 1/2018 | Sudhir | |
| 2019/0042458 A1* | 2/2019 | Kumar | G06F 12/0895 |
| 2019/0101973 A1 | 4/2019 | Ashkar | |
| 2022/0058132 A1* | 2/2022 | Roberts | G06F 12/0862 |
| 2023/0060194 A1* | 3/2023 | Retter | G06F 3/0631 |
| 2023/0325090 A1* | 10/2023 | Feld | G06F 3/0619 |
| | | | 711/137 |

* cited by examiner

DYNAMICALLY ALLOCATING MEMORY CONTROLLER RESOURCES FOR EXTENDED PREFETCHING

BACKGROUND

Disclosed herein is a system and related method for dynamically allocating memory controller resources for extended prefetching. Adding a separate extended prefetch read buffer to a memory controller may be beneficial to the operation of the memory controller, but may consume additional resources and increase the cost of a memory control design.

SUMMARY

According to one aspect disclosed herein, a memory controller comprises a system bus interface that connects the MC to a system processor, a system memory interface that connects the MC to a system memory, a read buffer comprising a plurality of entries constituting storage areas, the entries comprising at least one read buffer entry (RBE) and at least one extended prefetch read buffer entry (EPRBE), read buffer logic, dynamic controls that are used by the read buffer logic, and an MC processor comprising at least one extended prefetch machine (EPM), each corresponding to one of the at least EPRBEs, where the MC processor is configured to allocate and deallocate EPRBEs and RBEs according to an allocation method using the dynamic controls.

According to another aspect disclosed herein, a method for operating a memory controller (MC) comprises receiving, by the memory controller via a system bus interface, a prefetch request from a system processor, responsive to the prefetch request, allocating and deallocating, by an MC processor, read buffer entries (RBEs) and extended prefetch read buffer entries (EPRBEs) according to an allocation method using dynamic controls, where the RBEs and the EPRBEs are contained within a read buffer of the MC. The dynamic controls are utilized by read buffer logic for the allocation method, and the MC processor comprises extended prefetch machines (EPMs), each corresponding to one of the at least EPRBEs.

According to another aspect disclosed herein, a memory controller (MC) comprises a system bus interface that connects the MC to a system processor, a system memory interface that connects the MC to a system memory, a read buffer comprising a plurality of entries constituting storage areas, the entries comprising at least one read buffer entry (RBE) and at least one extended prefetch read buffer entry (EPRBE), read buffer logic, dynamic controls that are used by the read buffer logic, and an MC processor comprising at least one extended prefetch machine (EPM), each corresponding to one of the at least EPRBEs, wherein the MC processor is configured to allocate and deallocate EPRBEs and RBEs according to an allocation method using the dynamic controls, the allocation method uses read buffer logic that is configured to determine a buffer ratio as: (a) a number of EPMs hit by prefetch requests divided by (b) a number of EPMs dispatched, within a window, conditioned upon the buffer ratio exceeding a ratio threshold, increase a number of EPRBEs, and conditioned upon the buffer ratio falling below the ratio threshold, decrease the number of EPRBEs, and conditioned upon a determination that a number of existing EPRBEs is greater than or equal to a stop threshold, send a signal to the MC processor to prohibit the creation of new EPRBEs.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention are presented for purposes of illustration, but are not intended to be exhaustive or limited to the embodiments disclosed. Many modifications and variations will be apparent to those of ordinary skill in the art without departing from the scope and spirit of the described embodiments. The terminology used herein has been chosen to best explain the principles of the embodiments, the practical application or technical improvement over technologies found in the marketplace, or to enable others of ordinary skill in the art to understand the embodiments disclosed herein.

Dynamically Allocating Memory Controller Resources for Extended Prefetching

The following acronyms may be used below:

TABLE 1

| Acronyms | |
|---|---|
| CPU | central processing unit |
| EPM | extended prefetch machine |
| EPRB | extended prefetch read buffer |
| EPRBE | extended prefetch read buffer entry |
| MC | memory controller |
| RBE | read buffer entry |

Figure 1A:
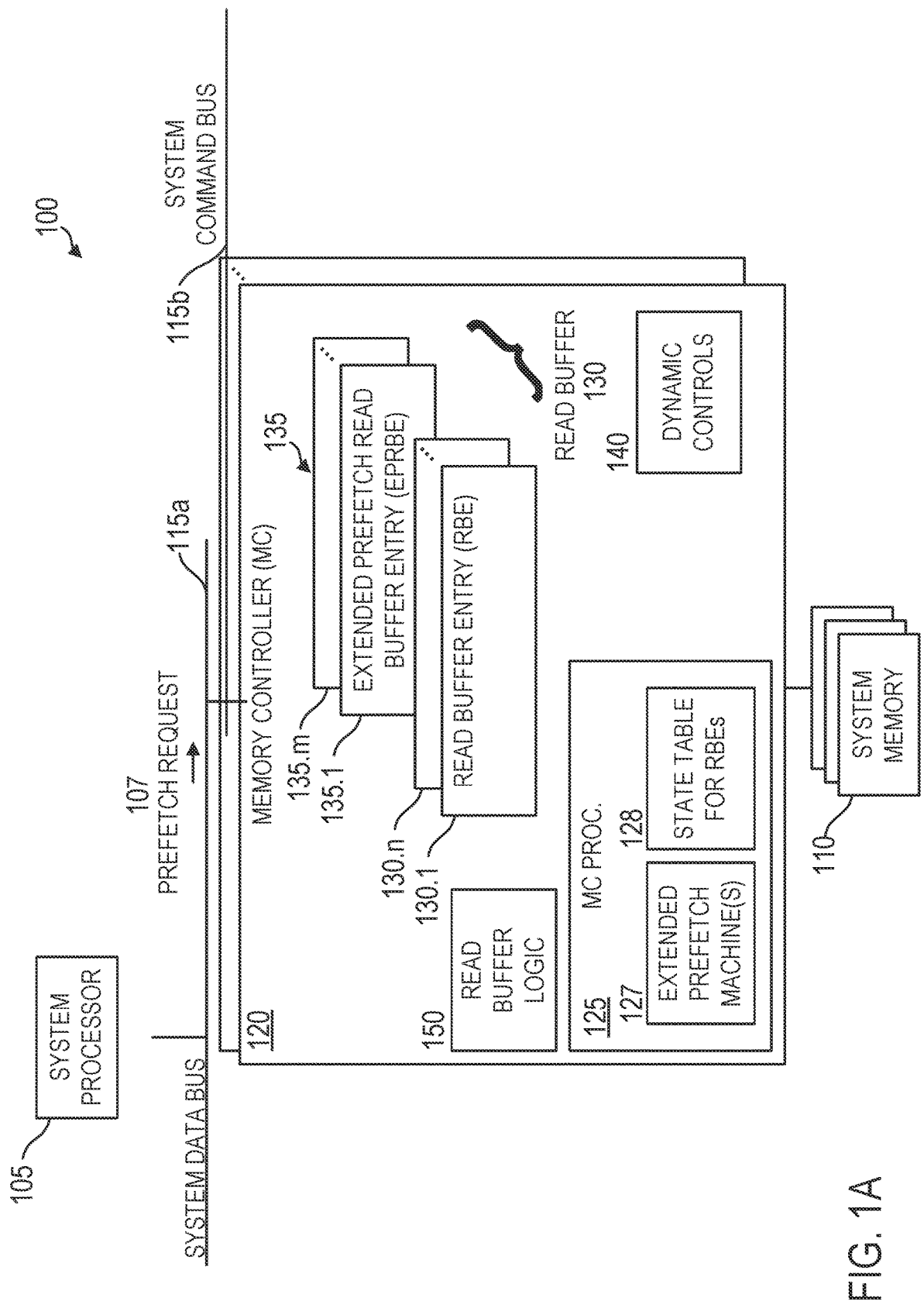
FIG. 1A is a block diagram of a computer system that utilizes a memory controller, according to some embodiments disclosed herein.

FIG. 1A is a block diagram of a computer system having a memory controller. A computer system 100 may contain many components, but central to the computer system 100 are the system processor or central processing unit (CPU) 105 and system memory 110. The access to the system memory 110 is provided by a memory controller (MC) 120. These may be connected to one another via a system command bus 115*a*, a system data bus 115*b*, and other possible busses as well (collectively "system bus 115"). Although FIG. 1A shows a single system processor, there may be multiple system processors and multiple memory controllers instances hanging off of the bus. The memory controller 120 may be implemented as a card, a chip, or any other electronic element, and may have an interface to the system bus 115 and the system memory 100.

MC 120 designs typically contain buffering in the form of a read data buffer 130 for read data being returned from the system memory 110 to the system processor 105 or other components that access data in the system memory 110. Various embodiments optimize usage of the read buffer 130. In normal operation, the read buffer 130 holds read data to the system data bus 115. However, when the entire capacity of the read buffer 130 is not used for this purpose, some of it may be used as the extended prefect read buffer 135. This approach may save resources and cost of a dedicated extended prefetch read buffer.

The MC 120 contains an MC processor 125, a read buffer 130, and dynamic controls 140. The MC processor 125 may comprise extended prefetch machines 127, a state table 128 for read buffer entries (RBEs) 130.1 to 130.*n* (which may be referred to as 130.*x*) and extended prefetch read buffer entries (EPRBEs) 135.1 to 135.*m* (which may be referred to as 135.*x* or collectively as 135), and read buffer logic 150. The read buffer 130 comprises the RBEs 130.1 to 130.*n* and the EPRBEs 135.1 to 135.*n*.

The MC processor 125 uses the read buffer logic 150 in conjunction with the read buffer 130 and dynamic controls 140 to provide temporary storage for read data from the time this read data is received from the system memory 110 by the MC 120 until is it delivered on the system data bus 115*a*. Any or all of the read buffer 130 operations described herein may be performed using the read buffer logic 150. In an example MC 120 design, each RBE 130.*x* and each EPRBE 135.*x* may be 128 bytes, and the entire read buffer 130 may comprises 32 of these RBEs 130.*x* and EPRBEs 135.*x* in total.

A prefetch request 107 as a prefetch operation/command is sent to the memory controller 120 on the system command bus 115*b* by the system processor 105. The prefetch command operates as essentially a look-ahead feature that results in getting prefetch data in a cache so that it can be accessed when a program that uses the data actually needs it. Although the system processor 105 has its own cache(s), it may also comprise prefetch logic that is used to carry out prefetching operations. The system processor's 105 prefetch logic looks at streaming workloads to determine if it makes sense to prefetch ahead.

When the MC 120 receives a prefetch request, if the conditions are met based on the read buffer logic 150 in conjunction with settings from the dynamic controls 140, the MC processor 125 then executes an extended or a "plus one" prefetch operation, which utilizes the address of the prefetch request 107 incremented by the cache line or unit of data transfer (in the above example, this would be 128 bytes). When the MC processor 125 sees the address of the prefetch request 107, it increments the address by the cache line, gets the next sequential line and puts the data into an EPRBE 135.*x*. This line of data then stays in the EPRBE 135.*x* until some other command hits this particular line of data, in which case the data can be transferred directly (from the EPRBE 135.*x* of the MC 120 itself), without having to access the system memory 110. If a data hit does not occur within a timeout limit, the data in the EPRBE 135.*x* may be freed up.

An extended prefetch read operation (prefetch request 107), has three states. A first state is that the prefetch request 107 has been issued to the system memory 110, but the data associated with the prefetch request 107 has not been received by the MC 120. A second state is that the prefetch data has been received by the MC 120 and resides in the EPRBE 135.X entry, but has not yet been hit. A third state is that the data resides in the EPRBE 135.X and has been hit, but is waiting to be actually delivered. A "hit" is defined as the system processor 105 (or other external entity) requesting memory contents that the MC 120 will or has provided from an EPRBE 135.*x*.

In some embodiments, the MC 120 simply looks ahead by one cache line—this keeps the read buffer logic 150 simple. However, this is not a limitation of the MC 120, and greater (and more complex) look-aheads could be implemented, although the system processor 105 may handle more complex predictor analysis for a data stream.

For some workloads, the entire read buffer 130 capacity is needed to maximize performance. In the example, this would mean that all 32 entries of the read buffer 130 are designated as RBEs 130.*x*. For other workloads, maximum performance can be obtained with some fraction of the total read buffer 130 storage, for example 12 RBEs. To maximize the read buffer 130 usage, it may be desirable to use a portion of the read buffer 130 for extended prefetch operations by allocating some of the RBEs 130.*x* to EPRBEs 135.*x*, where extended prefetch reads are generated internally in the MC 120, at an address offset provided by the system processor 105 prefetch request 107. Thus, in the example used above, 12 of the entries in the read buffer 130 are RBEs 130.*x*, and 20 of the entries are designated as EPRBEs 135.*x*. The tracking of whether an entry is an RBE 130.*x* or an EPRBE 135.*x* may be maintained, along with other information or state data for the entries of the read buffer 130 in a state table for RBEs 128. The state table 128 may contain additional information that permits a better determination to be made as to the transitioning of an RBE 130.*x* into an EPRBE 135.*x* and vice versa.

Using some of the RBEs 130.x as EPRBEs 135.x has the potential to allow subsequent system processor 105 prefetch reads (via the prefetch request 107) to retrieve extended prefetch data from the read data buffer 130 with much lower latency than a read to system memory 110. By reducing average prefetch read latency, it may be possible to reduce the area and power of the system processor 105 by reducing a number of prefetch machines in the system processor 105, without harming performance (since the lifetime of the system processor 105 prefetch machines may be shorter due to a reduced average prefetch latency).

If the portion of the read data buffer 130 to be used for extended prefetching (the EPRBEs 135) is selected statically, performance for workloads for which extended prefetching is not helpful can be poor (versus having no extended prefetching). Put differently, if a statically-sized extended prefetch read buffer 135 is used (a fixed number of EPRBEs 135.x), in certain circumstances, non-optimal operation occurs. Thus, it is advantageous to modify the size of the extended prefetch read buffer 135 dynamically during operation, dependent on the load on the system data bus 115b, among other things. In order to achieve this dynamic sizing of the extended prefect read buffer 135, the MC processor 125 may implement certain sizing logic as a part of the read buffer logic 150.

An extended prefetch machine (EPM) 137 is a dedicated set of resources configured to track the sequence of events described above related to the prefetch request 107. When the MC processor 125 sees the address of the prefetch request 107, it increments the address by the cache line, gets the next sequential line and puts the data into an EPRBE 135.x. This line of data then stays in the EPRBE 135.x until some other command hits this particular line of data, in which case the data can be transferred directly (from the EPRBE 135.x of the MC 120 itself), without having to access the system memory 110. If a data hit does not occur within a timeout limit, the data in the EPRBE 135.x may be freed up.

Three resource allocation methods for extended prefetching have been developed: 1) allocate MC 120 resources based on the success of previously dispatched extended prefetch operations; 2) allocate MC 120 resources based on the number of read data buffers 130 currently in use; and 3) deallocate MC 120 resources based on excessive read data buffer 130 usage.

First Resource Allocation Method

In the first resource allocation method, resources are allocated based on a determination of the success of currently allocated resources is performed, and if the system is performing well, e.g., the extended prefetch read buffer 135 is frequently getting hit, more resources will be allocated, and if the extended prefetch read buffer 135 is not frequently getting hit, fewer resources will be allocated. The MC processor 125 determines if data stored in an EPRBE 135.x is hit by a subsequent read operation.

Figure 1B:
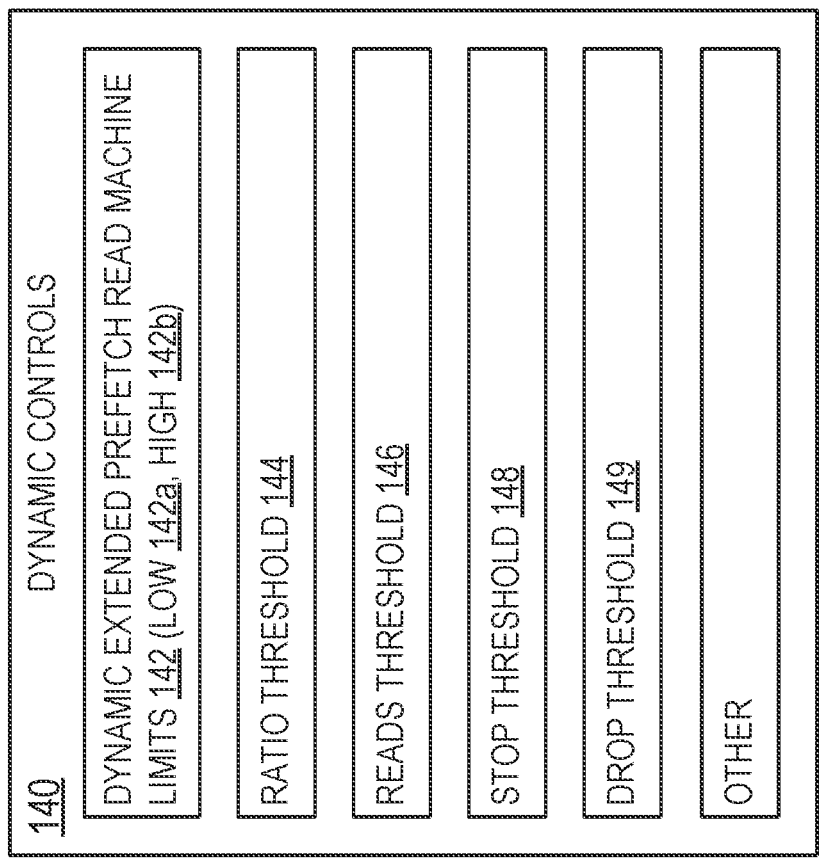
FIG. 1B is a block diagram of dynamic controls that may be utilized within the memory controller, according to some embodiments disclosed herein.

Dynamic read buffer controls (also referred to herein as dynamic controls) 140 may be used to regulate how much of the MC 120 resources are allocated for extended prefetch. FIG. 1B is a block diagram illustrating programmable variables that may be used as part of the DRBCs 140, including: dynamic extended prefetch read machine limits 142 (low 142a, and high 142b), a ratio threshold 144, a reads threshold 146, a stop threshold 148, and a drop threshold 149. In some embodiments, these variables may be dynamically changeable at runtime, programmable, or predefined prior to execution, and/or may initialize with default values.

Initially, a programmable number of EPMs 127 (and their corresponding EPRBEs 135) to be used for extended prefetch is set to a low value 142a, and this number of EPMs 127 and EPRBEs 135 are allocated/dispatched. In order to decide whether to allocate more EPRBEs 135 and EPMs 127 a buffer ratio may be determined as follows:

$$\text{buffer ratio} = \frac{\#EPMs \text{ hit}}{\#EPMs \text{ dispatched within a window}}$$

If the predefined buffer ratio exceeds a programmable ratio threshold 144 in a programmable window (e.g., 64 prefetch dispatches, or particular unit of time—the programmable window may be located within the dynamic controls 140), then this may be considered beneficial, and additional resources in the form of EPMs 127 and EPRBEs 135 may be allocated by the MC processor 125 for the prefetch plus one function, up to the programmable high limit 142b. Conversely, if this buffer ratio drops below the programmable ratio threshold 144, the number of EPMs 127 and EPRBEs 135 may be reduced towards the low limit 142a. The MC processor 125 starts at a low level and issues the prefetch plus one extended prefetch, and then determines how effective the EPRBEs 135.x are through the number of hits within the particular window of prefetch dispatches. For example, if the buffer ratio threshold is configured to 9/16 (0.5625), and the buffer ratio in a given window is 147/256 (147 EPMs hit out of 246 EPMs dispatched, buffer ratio=0.5742), additional EPM resources are allocated, since the buffer ratio has exceeded the buffer ratio threshold.

In some embodiments, the number of EPRBEs 135.x (and corresponding EPMs 127) may be bumped up (or down) by one per window. This rate permits a gradual linear change in the allocated resources. However, it is possible to use any sort of mathematical formula, in order to determine increase and decrease rates. These rates could also vary based on analytics performed by the MC processor 125—for example, certain types of observed conditions might warrant a gradual increase/decrease whereas other types of observed conditions might warrant a rapid increase/decrease.

The dynamic controls 140 may also include a number of prefetch reads in a programmable window, compared to a programmable read threshold 146. This may also be used to dynamically adjust the number of EPMs 127 and EPRBEs 135.

Thus these dynamic controls 140 allow the memory controller 120 to allocate more EPMs 127 and EPRBEs 135 for cases where extended prefetch is beneficial, and reduce memory controller 120 resources for cases where extended prefetch is not beneficial. The dynamic controls 140 in conjunction with the read buffer logic 150 may further include rate control information (e.g., in the form of equations and/or logic functions) to control the rate of increase/decrease or expansion/contraction of the extended prefetch read buffer 135 above and beyond the increase/decrease of one unit/window/line.

Second Resource Allocation Method

In a second resource allocation method, resources are allocated based on the number of EPRBEs 135.x in use. If the MC processor 125 determines that more than a stop threshold 148 (in the dynamic controls 140) number of EPRBEs 135.x have been used, a signal may be sent by the read buffer logic 150 to the MC processor 125 to indicate that no more EPMs 127 or EPRBEs 135.x (from the read buffer 130) should be allocated (i.e., that a maximum number of resources have been used). Put differently, the stop threshold 148 operates so that if the number of EPMs 127 and EPRBEs 135.x in use exceeds the programmable stop threshold 148, the dispatch of EPMs 127 and new EPRBEs 135.x is halted/prohibited. The dispatches may resume with the number of EPRBEs 135.x falls below the stop threshold 148.

Third Resource Allocation Method

In a third resource allocation method, resources are deallocated based on excessive EPRBEs 135.x usage. The third resource allocation method uses a further threshold value—the drop threshold 149. If the MC processor 125 determines that more than the drop threshold 149 (in the dynamic controls 140) number of EPRBEs 135.x have been used, a signal may be sent to the MC processor 125 to actively reduce (e.g., drop) one of the prefetches that have already been fetched from the system memory 110, and the data from the fetch has been put in an EPRBEs 135.x. With this method, the MC 120 has already fetched the prefetch information from the memory 110 and put it in an EPRBE 135.x, but has not been hit with a read request, these constituting candidate criteria for EPRBE deletion. In essence, this is used to say that the MC processor 125 determines that the EPRBEs 135.x exceeds the drop threshold 149 and thus has too many EPRBEs 135.x allocated. The active reduction may be to drop a single EPRBE or a reduction according to an equation, using parameters in the dynamic controls 140 or other location.

With the third method, a signal is sent to the MC processor 125 by the read buffer logic 150 to alert it to drop an EPRBE 135.x (and corresponding EPM 127). The MC processor 125 will choose an EPRBE to drop containing the prefetch data, but that has not yet been hit by a read request. In one embodiment, the MC processor 125 simply loops through the EPRBEs 135.x looking for an EPRBE 135.x that is in this state. When it finds one, it can then drop the found EPRBE 135.x. However, it may be possible to use a more complex equation or algorithm not only to determine which EPRBE 135.x to drop, but how many and/or how often to drop EPRBEs 135.x. By way of example, the state table 128 may contain information as to how close an EPRBE 135.x is to becoming idle, and the closest one to being idle may be the one that gets dropped. Other state information associated with the read buffer 130 may be utilized as well.

Additional read buffer dynamic controls 140 may also include a drop threshold 149 for a read buffer extended prefetch drop. This extended prefetch drop only occurs in the state where the EPRBE 135.x has received the data but has not been hit by a read request yet.

When a new prefetch request command 107 is received on the system command bus 115b, and it hits an EPRBE 135.x, there is a command phase during which the prefetch request command 107 itself is processed, and a confirmation phase later that tells the memory controller that the data is really needed at this time and to deliver this data. Within the system there are caches as well, so the memory line may have been intervened by a cache memory somewhere as well. A delay exists from the time the prefetch request command 107 is issued and hits the EPRBE 135.x until the confirmation that the data really needs to be delivered from the EPRBE 135.x is received. During that period of delay time, the EPRBE 135.X is in a state where it has been hit, but the data has not been delivered yet (this is true of any read, even a non-EPRB read for read buffer entries 130.x).

The drop threshold 149 operates so that if the number of EPMs 127 and EPRBEs 135 in use exceeds the programmable drop threshold, EPMs 127 and EPRBEs 135 holding extended prefetch read data, which have not been hit by a subsequent processor prefetch read request 107, are deallocated until the number of EPRBEs 135 in use falls below the drop threshold 149.

For the read buffer extended prefetch drop, there may be some lag between: 1) a read buffer count 127 going over the drop threshold 149 to discard extended prefetch ops; and 2) the read buffer logic 150 being notified that the EPM 137 has gone idle. If the extended prefetch drop request is sent from the read buffer logic 150 over to the MC processor 125, the feedback to the read buffer logic 150 may be limited—the read buffer logic 150 is unable to determine that something was dropped until it sees that the MC processor 125 is done with the read and that some EPRBEs 135.x were freed up. Thus, the following logic makes the assumption that the drop request actually resulted in a drop of an EPRBE 135.x. This logic allows addition control on the function.

Thus, to account for the lag noted above, according to some embodiments, the read buffer logic 150 may count up to some predefined number (e.g., 15) of pending extended prefetch drop requests. The read buffer logic 150 may then adjust its current buffer count 127 down by some predefined number, e.g., two, for each pending drop request (depending on whether this feature is enabled), and send drop requests only when an adjusted buffer count 127 is over the drop threshold 149.

The pending extended prefetch drop count may decrement whenever a read machine exit ("free") frees two buffers 135 (the free could be due to any operation, but any two buffers, e.g., are sufficient). Since there is no positive indication that drop requests will have any effect (there may be no extended prefetch ops active, and the read buffer is full for some other reason) the extended prefetch drop pending count may be made to decay (decrement) periodically, so eventually it will return to an un-adjusted read buffer count. The pending drop count may be clamped so that it does not increment above some predefined upper limit, e.g., fifteen, or decrement below some predefined lower limit, e.g., zero.

The pending extended prefetch drop count helps to avoid sending too many drop requests. Without this feedback, too many drop requests could be made, causing the number of EPRBEs 135.x to go way below the threshold. So, an initial assumption is made that any drop requested was successful, and then an additional function is applied that, over time, decrements the excessive drop counter just in case the drops really didn't occur, which helps the system get back a normal state.

Figure 2A:
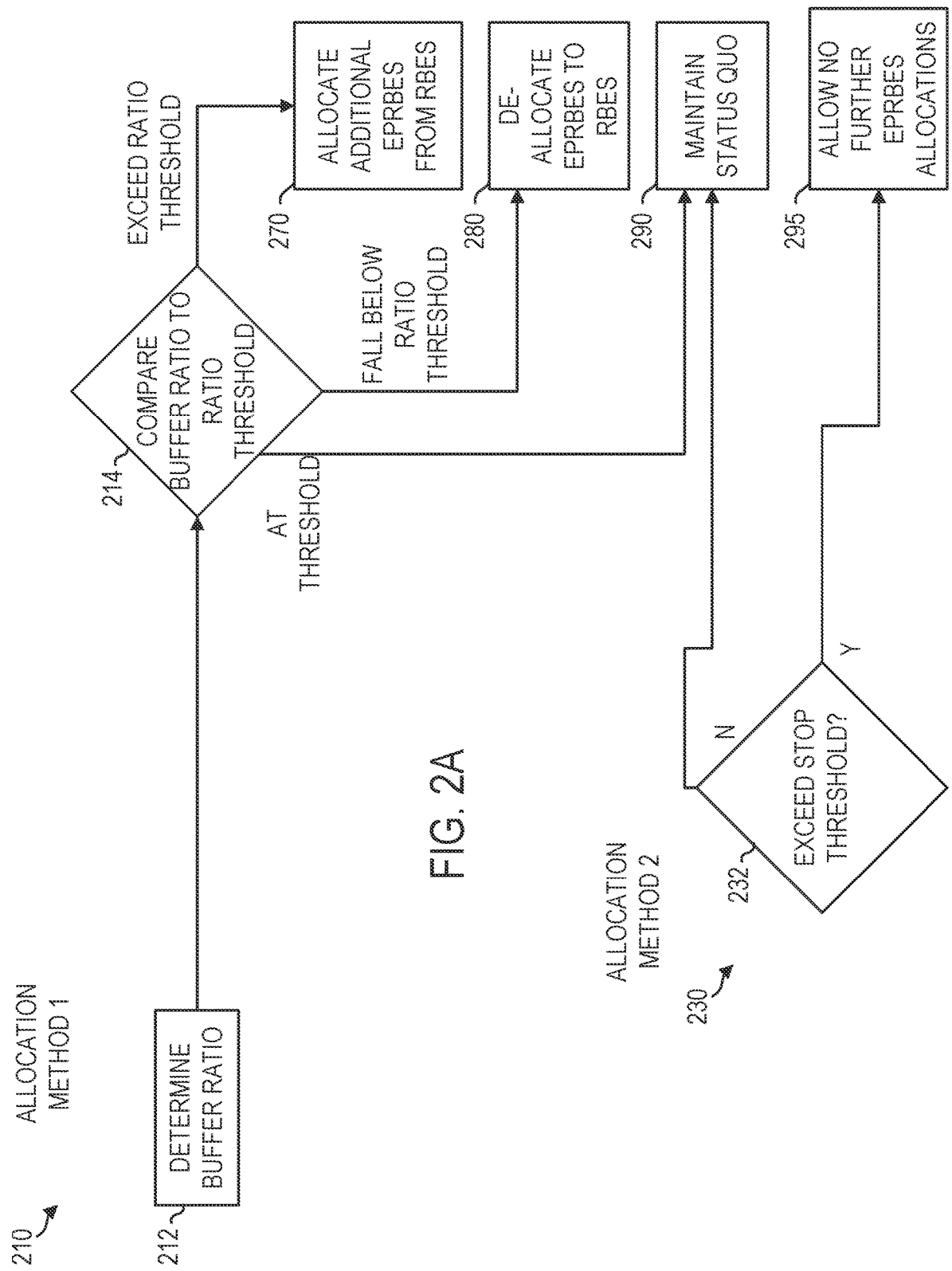
FIG. 2A is a flowchart illustrating a method for operating the memory controller in first and second resource allocation methods, according to some embodiments disclosed herein.

FIG. 2A is a flowchart illustrating a method for operating the memory controller in a first resource allocation method 210, according to some embodiments disclosed herein. In operation 212, the buffer ratio calculation is performed, as described above. In operation 214, the buffer ratio is compared to the ratio threshold. If the buffer ratio exceeds the ratio threshold, then in operation 270 additional EPRBEs are allocated. If the buffer ratio falls below the ratio threshold, then in operation 280, EPRBEs are deallocated. If the buffer ratio is at the threshold, then the status quo is maintained.

FIG. 2A also illustrates a method for operating the memory controller in a second resource allocation method 230, according to some embodiments disclosed herein. In operation 232, a test is made to determine if the number of EPRBEs exceed a stop threshold. If not (232: N), then the status quo is maintained 290. Otherwise (232: Y) in operation 295, no further EPRBEs are allowed to be allocated.

Figure 2B:
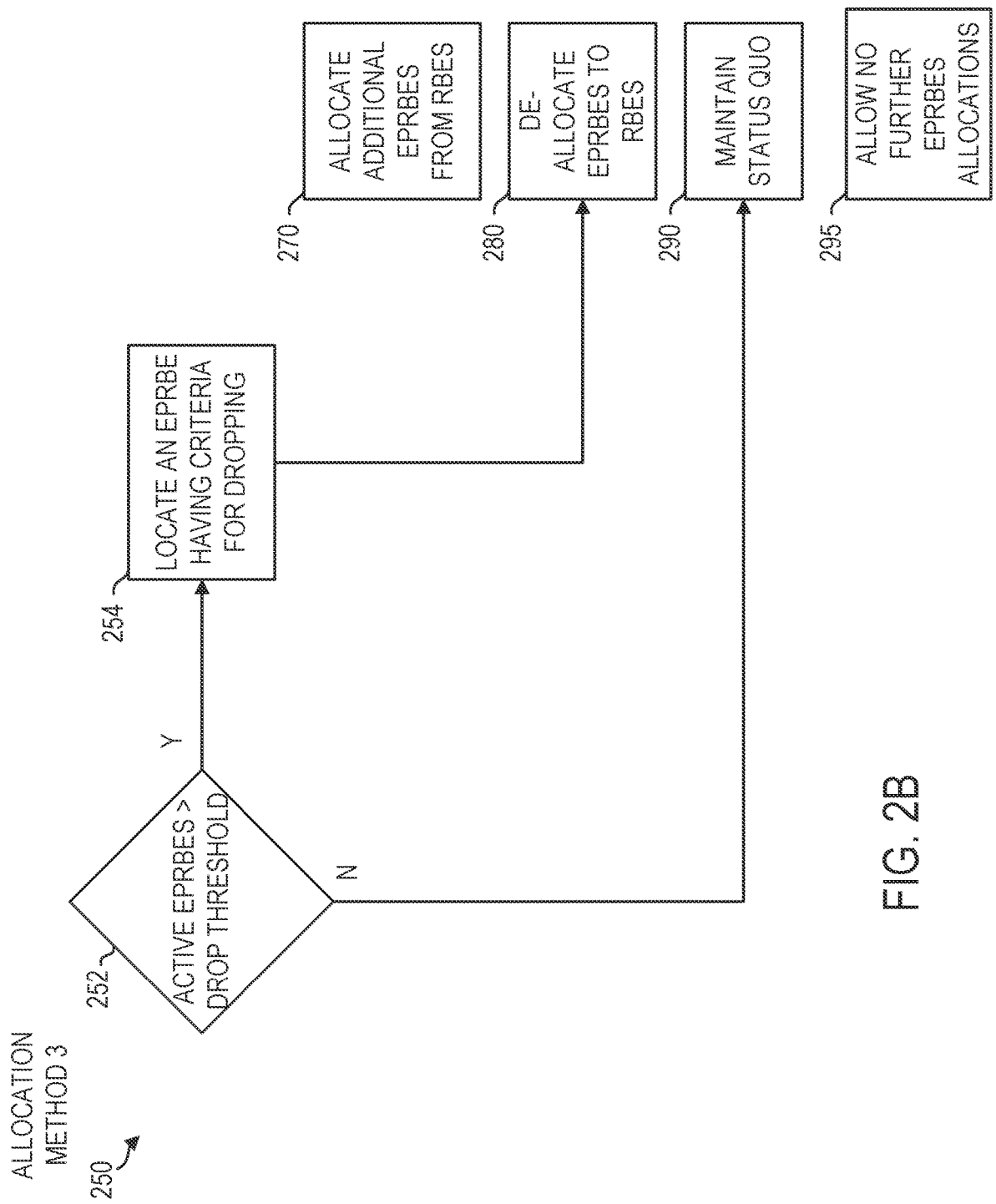
FIG. 2B is a flowchart illustrating a method for operating the memory controller in a third resource allocation method, according to some embodiments disclosed herein.

FIG. 2B is a flowchart illustrating a method for operating the memory controller in a third resource allocation method 250, according to some embodiments disclosed herein. In operation 252, if the number of active EPRBEs is greater than the drop threshold (252: Y), then in operation 254, an EPRBE is located that has the proper criteria for dropping, as discussed above, and in operation 280, this EPRBE is deallocated. Otherwise (252: N) the status quo is maintained 290

Although the resource allocation methods are discussed above individually, in actual use, these resource allocation methods may be used individually or in any combination.

Technical Application

One or more embodiments disclosed herein accordingly provide an improvement to computer technology. For example, an improvement to a memory controller that is used within computer systems allows for a more efficient architecture of a computer system.

What is claimed is:

1. A memory controller (MC) comprising:
a read buffer comprising a plurality of entries constituting storage areas, the entries comprising at least one read buffer entry (RBE) and at least one extended prefetch read buffer entry (EPRBE);
read buffer logic that is configured to:
determine a buffer ratio;
conditioned upon the buffer ratio exceeding a ratio threshold, increase a number of EPRBEs without exceeding a high dynamic extended prefetch read machine limit; and
conditioned upon the buffer ratio falling below the ratio threshold, decrease the number of EPRBEs without falling below a low dynamic extended prefetch read machine limit; and
an MC processor comprising:
at least one extended prefetch machine (EPM) corresponding to the at least one EPRBE;
wherein:
the MC processor is configured to allocate and deallocate EPRBEs and RBEs.

2. The memory controller of claim 1, wherein the buffer ratio is: (a) a number of EPMs hit by prefetch requests divided by (b) a number of EPMs dispatched, within a programmable window.

3. The memory controller of claim 2, wherein the increasing of the number of EPRBEs and the decreasing of the number of EPRBEs is an increase of one for the programmable window.

4. The memory controller of claim 2, wherein the increasing of the number of EPRBEs and the decreasing of the number of EPRBEs is an increase according to an equation that uses rate control information to define rate control.

5. The memory controller of claim 2, further comprising dynamic controls that are used by the read buffer logic, and wherein:
the high dynamic extended prefetch read machine limit is stored in the dynamic controls; and
the low dynamic extended prefetch read machine limit is stored in the dynamic controls.

6. The memory controller of claim 1, wherein the memory controller initializes with the low dynamic extended prefetch read machine limit number of EPRBEs.

7. The memory controller of claim 1, wherein the read buffer logic is configured to:
determine a number of prefetch reads within a programmable window;
conditioned upon the number of reads being greater than a reads threshold, the number of EPRBEs is increased; and
conditioned upon the number of reads being less than the reads threshold, the number of EPRBEs is decreased.

8. The memory controller of claim 1, wherein the read buffer logic is further configured to, conditioned upon a determination that a number of existing EPRBEs is greater than or equal to a stop threshold, send a signal to the MC processor to prohibit the creation of new EPRBEs.

9. A method for operating a memory controller (MC) comprising:
receiving, by the memory controller via a system bus interface, a prefetch request from a system processor;
responsive to the prefetch request, allocating and deallocating, by an MC processor, read buffer entries (RBEs) and extended prefetch read buffer entries (EPRBEs) by, conditioned upon a determination that a number of currently allocated EPRBEs exceeds a drop threshold, sending a signal to the MC processor to actively reduce a number of EPRBEs, and wherein the number of EPRBEs for active reduction are determined to satisfy candidate criteria by being in a state in which data the number of EPRBEs contain has been fetched from a system memory, but have not been hit by a read request;
wherein:
the RBEs and the EPRBEs are contained within a read buffer of the MC; and
the MC processor comprises extended prefetch machines (EPMs) corresponding to the at least one EPRBE.

10. The method of claim 9, wherein the allocating and deallocating further comprises:
determining a buffer ratio as: (a) a number of EPMs hit by prefetch requests divided by (b) a number of EPMs dispatched, within a programmable window;
conditioned upon the buffer ratio exceeding a ratio threshold, increasing the number of EPRBEs; and
conditioned upon the buffer ratio falling below the ratio threshold, decreasing the number of EPRBEs.

11. The method of claim 9, wherein the allocating and deallocating further comprises:
determining a number of prefetch reads within a programmable window;
conditioned upon the number of reads being greater than a reads threshold, increasing the number of EPRBEs; and
conditioned upon the number of reads being less than the reads threshold, decreasing the number of EPRBEs.

12. The method of claim 9, wherein the allocating and deallocating further comprises, conditioned upon determining that a number of existing EPRBEs is greater than or equal to a stop threshold, sending a signal to the MC processor to prohibit the creation of new EPRBEs.

13. The method of claim 9, wherein
the MC processor actively reduces the number of EPRBEs by dropping one EPRBE in response to the signal.

14. A memory controller (MC) comprising:
a system memory interface that connects the MC to a system memory;
a read buffer comprising a plurality of entries constituting storage areas, the entries comprising at least one read buffer entry (RBE) and at least one extended prefetch read buffer entry (EPRBE);
read buffer logic that is configured to:
conditioned upon a determination that a number of currently allocated EPRBEs exceeds a drop threshold, send a signal to an MC processor to actively reduce a number of EPRBEs, wherein the number of EPRBEs for active reduction are determined to satisfy candidate criteria by being in a state in which data the number of EPRBEs contain has been fetched from the system memory, but have not been hit by a read request; and the MC processor comprising:
  at least one extended prefetch machine (EPM) corresponding to the at least one EPRBE;
wherein:
  the MC processor is configured to allocate and deallocate EPRBEs and RBEs.

15. The memory controller of claim 14, wherein the MC processor actively reduces the number of EPRBEs by dropping one EPRBE in response to the signal.

16. The memory controller of claim 15, wherein the one EPRBE dropped is a first EPRBE determined to meet the candidate criteria.

17. The memory controller of claim 16, wherein the MC processor utilizes an excessive drop counter to prevent excessive drops from occurring.

18. The method of claim 13, wherein the one EPRBE dropped is a first EPRBE determined to meet the candidate criteria.

19. The method of claim 18, wherein the MC processor utilizes an excessive drop counter to prevent excessive drops from occurring.

* * * * *